UNITED STATES PATENT OFFICE.

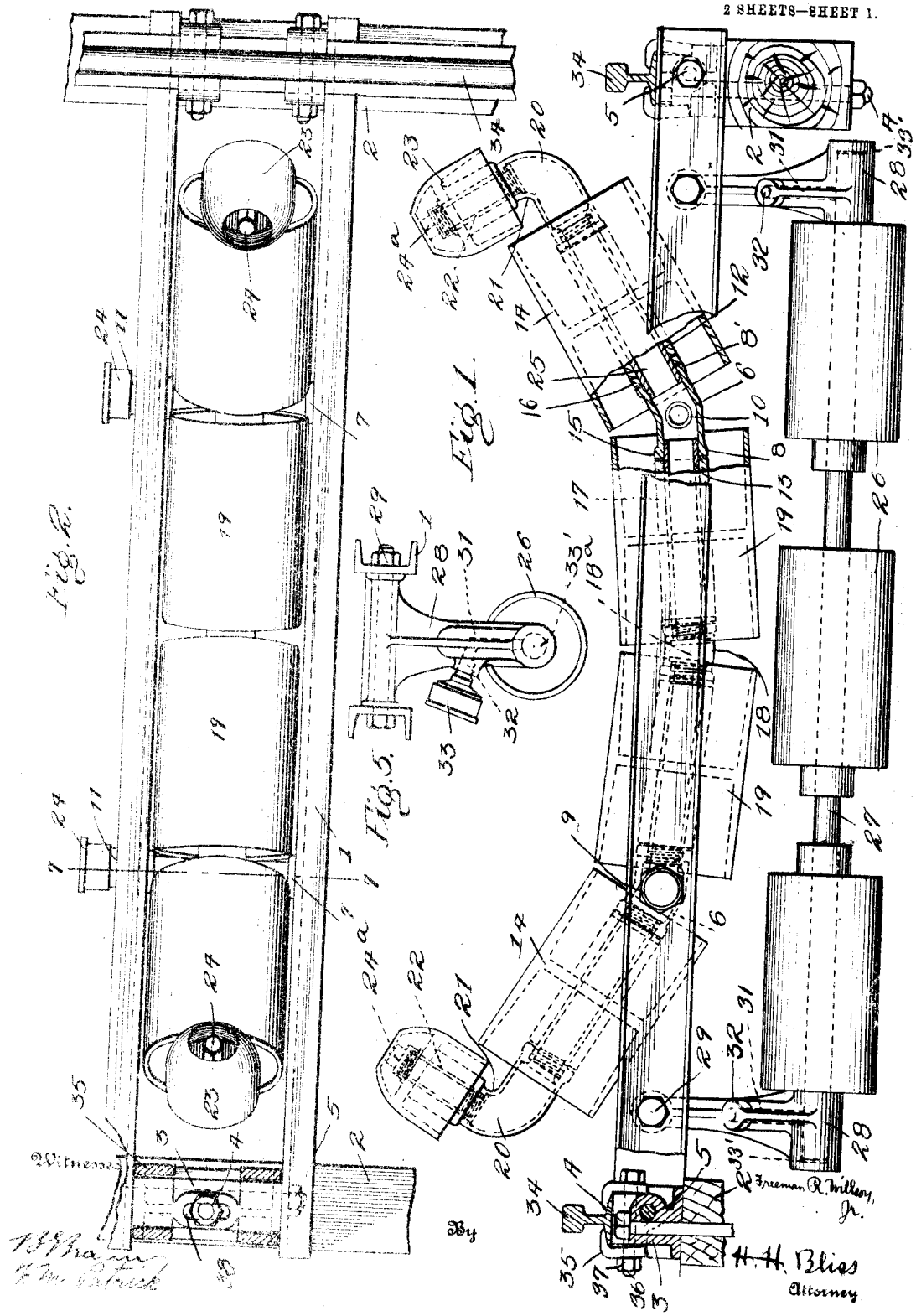

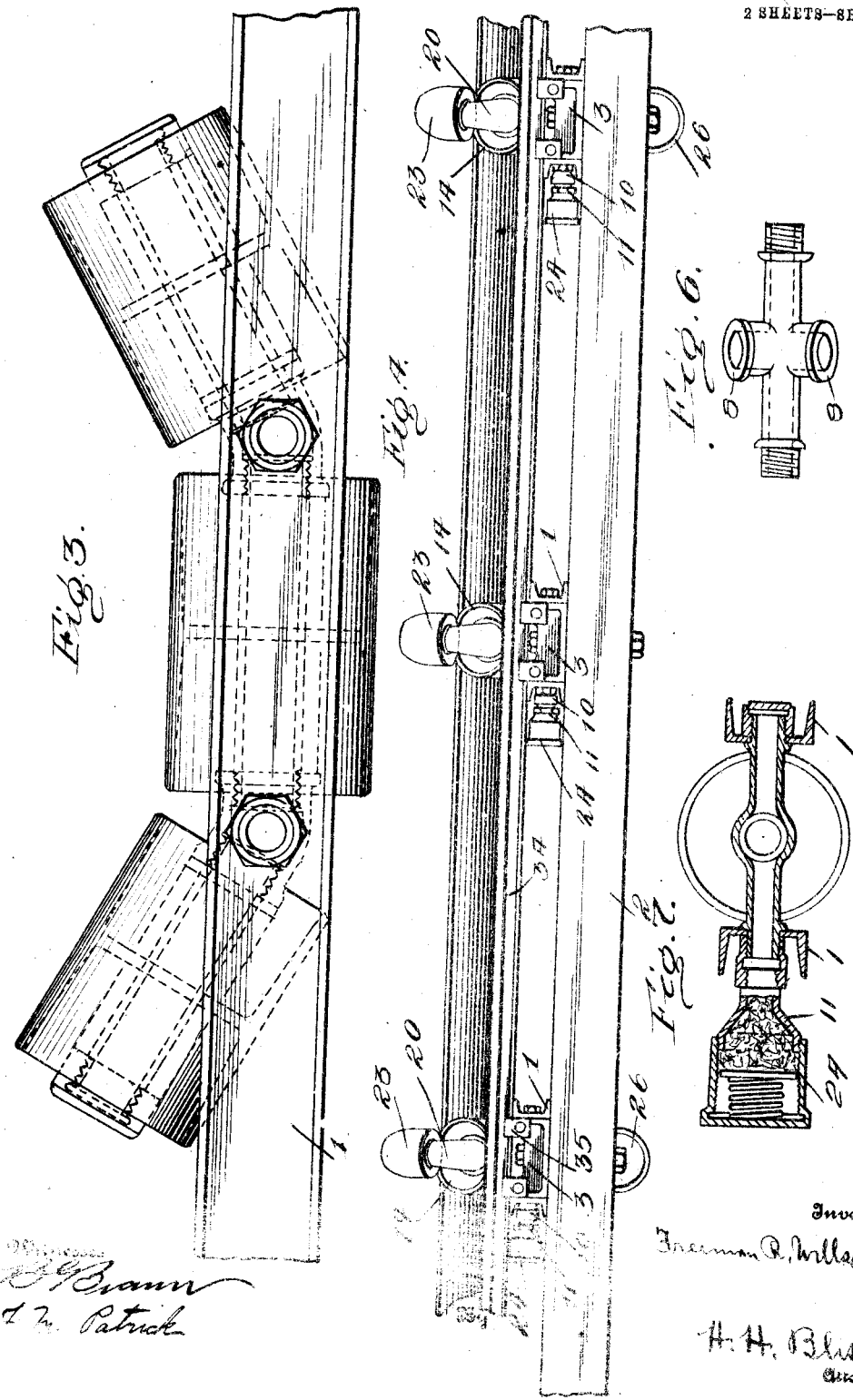

FREEMAN R. WILLSON, JR., OF WORTHINGTON, OHIO, ASSIGNOR TO THE JEFFREY MANUFACTURING COMPANY, A CORPORATION OF OHIO.

CONVEYER-BELT SUPPORT.

1,088,644.  Specification of Letters Patent.  Patented Feb. 24, 1914.

Application filed February 3, 1908, Serial No. 414,096. Renewed January 26, 1914. Serial No. 814,550.

*To all whom it may concern:*

Be it known that I, FREEMAN R. WILLSON, Jr., a citizen of the United States, residing at Worthington, in the county of Franklin and State of Ohio, have invented certain new and useful Improvements in Conveyer-Belt Supports, of which the following is a specification, reference being had therein to the accompanying drawing.

My invention relates to conveyer belt supports, and has for its object to provide an improved troughing mechanism, and improved means of mounting the belt support as a whole.

The guide idlers illustrated in the drawings of this application are described and claimed in my co-pending application Ser. No. 761,784, filed April 17, 1913.

In the drawings, Figure 1 is a side elevation of one group of belt supporting pulleys. Fig. 2 is a plan view of the same. Fig. 3 is a view in elevation of a modified form of construction. Fig. 4 is a view in side elevation showing several sets of pulleys. Fig. 5 is an end elevation of the bracket 28. Fig. 6 is a plan view of the tubular casting 6. Fig. 7 is a vertical section along the line 7—7 of Fig. 2.

In the drawings, 1—1 indicate channel beams bolted at their ends to the stringers 2—2 by means of the castings 3—3 and bolts 4—4 and 5—5 securing the channels to the casting and the casting to the stringers.

Carried by the channels 1—1 are the tubular castings 6—6, having the four arms 7—7' and 8—8'. The arms 7—7' enter holes in the webs of the channel beams, and the internally screw-threaded capped nut 9 engages the projecting end of the arm 7, and the threaded projecting end of the opposite arm 7' carries the internally threaded thimble 10, which in turn supports the grease cup 11. The other arms 8—8' are tapped to receive the hollow shafts 12 and 13. The shaft 12 is mounted at a considerable inclination to the horizontal and the shaft 13 at an angle more nearly approaching the horizontal. Upon the shaft 12 is mounted the pulley 14, which is free to rotate thereon being held in position longitudinally by the boss 15 of the tubular casting, which acts as an end-thrust bearing. The washer 16 is interposed between this boss and the end of the hub 17 of the pulley.

The two hollow shafts 13—13 are connected at their inner ends by the center casting 18, being screwed into tapped holes in the ends of the casting. The pulleys 19—19 are carried by these hollow shafts 13—13. To the outside ends of the hollow shafts 12—12 are threaded the tubular castings 20—20, each having therein a right-angle bend 21. Into the other end of each of these pipe castings is screwed the hollow shaft 22, upon which is mounted the guide idler pulley 23. A nut 24ª upon the end of each of these hollow shafts 22 fixes its guide pulleys 23 in position. The rounded upper ends of the guide pulleys furthermore provide a very considerable aid in centering the belt after it has passed through a tripping mechanism and prevent the edges of the belt from becoming frayed from contact with the square upper ends of the usual type of guide idler pulleys.

The peripheral surfaces of the pulleys 23 are provided with a rounded taper at their upper ends to facilitate the elevation of the belt from the troughing pulleys 13 and 14, when a traveling tripping device is employed to incline the belt transversely for unloading material into bins or other receptacles, at a number of points along the path of the conveyer.

By reason of the central, vertical wall 18ª in the center casting 18, the space within the hollow shafts and connecting pipe castings is divided into two continuous lubricant-holding chambers, which are fed each from one of the grease cups 11. The lubricant under pressure from the spring-pressed cap 24, is forced into all parts of the hollow shafting, through the lubricant channels 25 to the wearing surfaces of the pulleys.

The return idler pulleys 26 are carried by the shaft 27, to which they are rigidly attached, which is in turn suspended in the bearing brackets 28—28 hung from the horizontal bolts 29, extending across from channel to channel. Each bracket is cored as at 31 to provide a lubricant duct, leading from the threaded aperture 32 into which is threaded the grease cup 33, to the bearing socket 33'. These return idler pulleys are preferably omitted from alternate troughing idler frames.

Heretofore bracket standards bolted to the upper side of wooden or metal girders have been used to support journals for the troughing pulleys, and other brackets bolted to the under side of the girders have carried the return pulleys, or the latter have been carried directly by the stringers 2. The disadvantage of this arrangement has been the great loss of space vertically, the saving of which is exceedingly important in some instances. By mounting the pulleys between two horizontal transverse beams, I am enabled to save the vertical space hitherto occupied by the frame bars, and to bring the upper surface of the return rollers in close proximity to the surface of the troughing rollers.

The brackets 3 are peculiarly constructed so as to perform the three functions of clamping the channel beams 1 to the stringers 2, the channel beams to each other and the rail 34 to the top flanges of the channels. These rails, which are designed to guide the traveling belt tripper as it moves from one position of adjustment to another, are clamped upon the channels by means of the clamp plates 35, which are drawn toward each other by the bolt 36 and nut 37, in such a way as to wedge the tapered base of the rail to position. This casting is provided with the slotted hole 38, through which the bolt 4 passes. When the nut 39, upon the lower end of the bolt 4, is unscrewed the channels, as a whole, can be moved longitudinally of the stringer, a possibility of adjustment which is very desirable, as it furnishes a means of correcting any inclination on the part of the belt to climb from one side to the other of the troughing pulleys.

In Fig. 3, I have shown a three-pulley belt support which is preferably employed with narrow belts, but which is constructed and mounted in a manner substantially the same as that already described.

What I claim is:

1. In a conveyer belt support, the combination of two straight transverse bars with vertical webs or plates, a pair of opposite perforations in the webs, a bracket mounted between the webs and having parts extending through each of said perforations and secured to the webs thereby, and troughing pulleys mounted on the said bracket, oppositely directed therefrom, and located between and in the same horizontal planes with said webs.

2. In a conveyer, a belt support comprising a pair of transverse bars or braces, a bracket mounted on, between and in the same horizontal planes with said bars, and two oppositely directed shafts with their axes inclined to each other, mounted on said bracket and between and in the same horizontal planes with the bars, and idler pulleys mounted on the shafts.

3. In a conveyer, a belt support comprising a pair of braces, the four-armed tubular brackets 6, 6 supported thereby each adapted to carry two oppositely directed shafts with their axes inclined to each other, the shafts carried by said tubular brackets and idler pulleys mounted thereon.

4. In a conveyer, a belt support comprising a pair of braces, an upper set of idler pulleys supported thereby, a lower set of pulleys mounted on a single shaft, downward extending brackets in which the ends of said single shaft are journaled, and the downward extending brackets pivotally connected at their upper ends to the braces on axes parallel to the travel of the belt.

5. In a conveyer belt support, a pair of cross bars, pulleys mounted thereon, stringers to which the cross bars are secured, a rail for a traveling belt tripper, and the single block 3 designed to hold in rigid relation to one another, the two bars, the rail and the stringer.

6. In a conveyer belt support, a pair of cross-bars, pulleys mounted thereon, stringers to which the cross-bars are secured, a single block 3 designed to hold in relation to one another the two bars and the stringer, the said block being adapted to provide horizontal angular adjustment of the cross-bars, substantially as set forth.

7. In a conveyer, a belt support comprising a pair of braces, the four-armed tubular brackets 6, 6 supported thereby each adapted to carry two oppositely directed shafts, the shafts carried by said tubular brackets and idler pulleys mounted thereon, and grease cups secured to the tubular brackets.

8. In a conveyer belt support, a continuous hollow member, pulleys mounted thereon, means for supplying a lubricant to the interior of said member and transverse supports extending from the hollow member.

9. In a conveyer belt support, the combination of a continuous hollow member, pulleys mounted thereon, transverse hollow supporting members connecting with the interior of the continuous hollow member, and means for supplying lubricant through the said transverse hollow supports.

In testimony whereof I affix my signature, in presence of two witnesses.

FREEMAN R. WILLSON, Jr.

Witnesses:
WILLIAM W. WILLSON,
EDWARD T. WILLSON.